(12) United States Patent
Furutani

(10) Patent No.: US 9,972,231 B1
(45) Date of Patent: May 15, 2018

(54) VISIBLE IMAGE FORMING APPARATUS AND IMAGE FORMING APPARATUS

(71) Applicant: KYOCERA Document Solutions Inc., Osaka (JP)

(72) Inventor: Hiroshi Furutani, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days. days.

(21) Appl. No.: 15/553,364

(22) PCT Filed: Feb. 12, 2016

(86) PCT No.: PCT/JP2016/054175
§ 371 (c)(1),
(2) Date: Aug. 24, 2017

(87) PCT Pub. No.: WO2016/152309
PCT Pub. Date: Sep. 29, 2016

(30) Foreign Application Priority Data

Mar. 26, 2015  (JP) ................. 2015-064989

(51) Int. Cl.
*G09G 3/00* (2006.01)
*G03G 15/00* (2006.01)
*H04N 1/00* (2006.01)
*G02B 27/22* (2018.01)

(52) U.S. Cl.
CPC ......... *G09G 3/002* (2013.01); *G02B 27/2292* (2013.01); *G03G 15/5016* (2013.01); *H04N 1/00267* (2013.01); *G09G 2340/14* (2013.01); *G09G 2354/00* (2013.01); *G09G 2358/00* (2013.01); *H04N 2201/0089* (2013.01); *H04N 2201/0094* (2013.01)

(58) Field of Classification Search
CPC .................. G09G 3/002; G03G 15/5016
See application file for complete search history.

(56) References Cited

U.S. PATENT DOCUMENTS

| 7,533,995 B2 | 5/2009 | Momiuchi et al. |
| 7,766,485 B2 | 8/2010 | Momiuchi et al. |
| 2005/0068999 A1 | 3/2005 | Momiuchi et al. |
| 2009/0213340 A1 | 8/2009 | Momiuchi et al. |

FOREIGN PATENT DOCUMENTS

| JP | 2003-233339 A | 8/2003 |
| JP | 2007-206588 A | 8/2007 |
| JP | 2010-078623 A | 4/2010 |
| JP | 2013-127625 A | 6/2013 |

*Primary Examiner* — David M Gray
*Assistant Examiner* — Andrew V Do
(74) *Attorney, Agent, or Firm* — IP Business Solutions, LLC

(57) ABSTRACT

An image forming apparatus 1 includes a visible image forming unit 50 that forms a visible image in the air, a screen image generation unit 102 that generates a screen image, and a controller 100 that causes the visible image forming unit 50 to generate the visible image representing the screen image generated by the screen image generation unit 102. When the visible image contains predetermined private information, the controller 100 causes the screen image generation unit 102 to generate a second screen image representing the private information and inclined by a predetermined angle with respect to a main screen of the screen image, so as to restrict a person other than an operator from viewing the private information, and causes the visible image forming unit 50 to form a visible image of the second screen image generated.

6 Claims, 13 Drawing Sheets

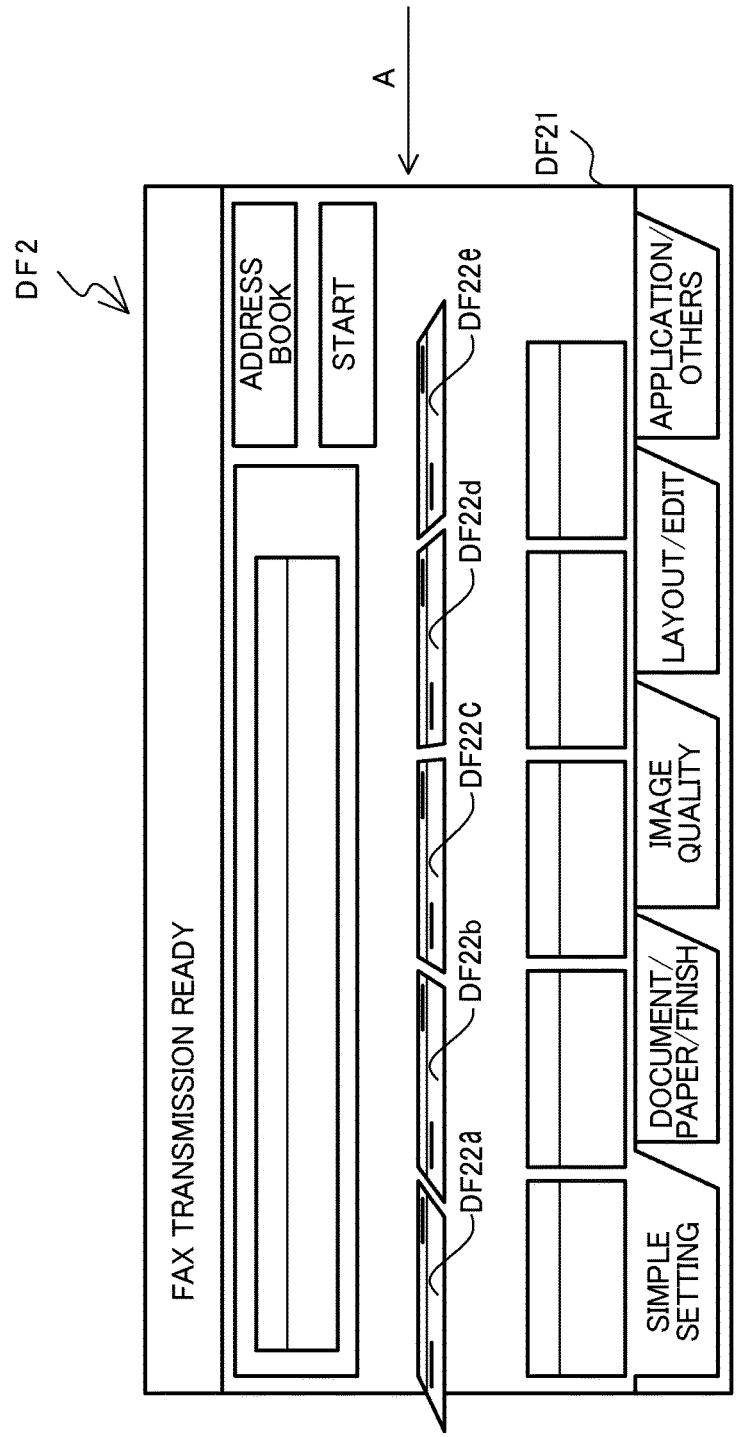

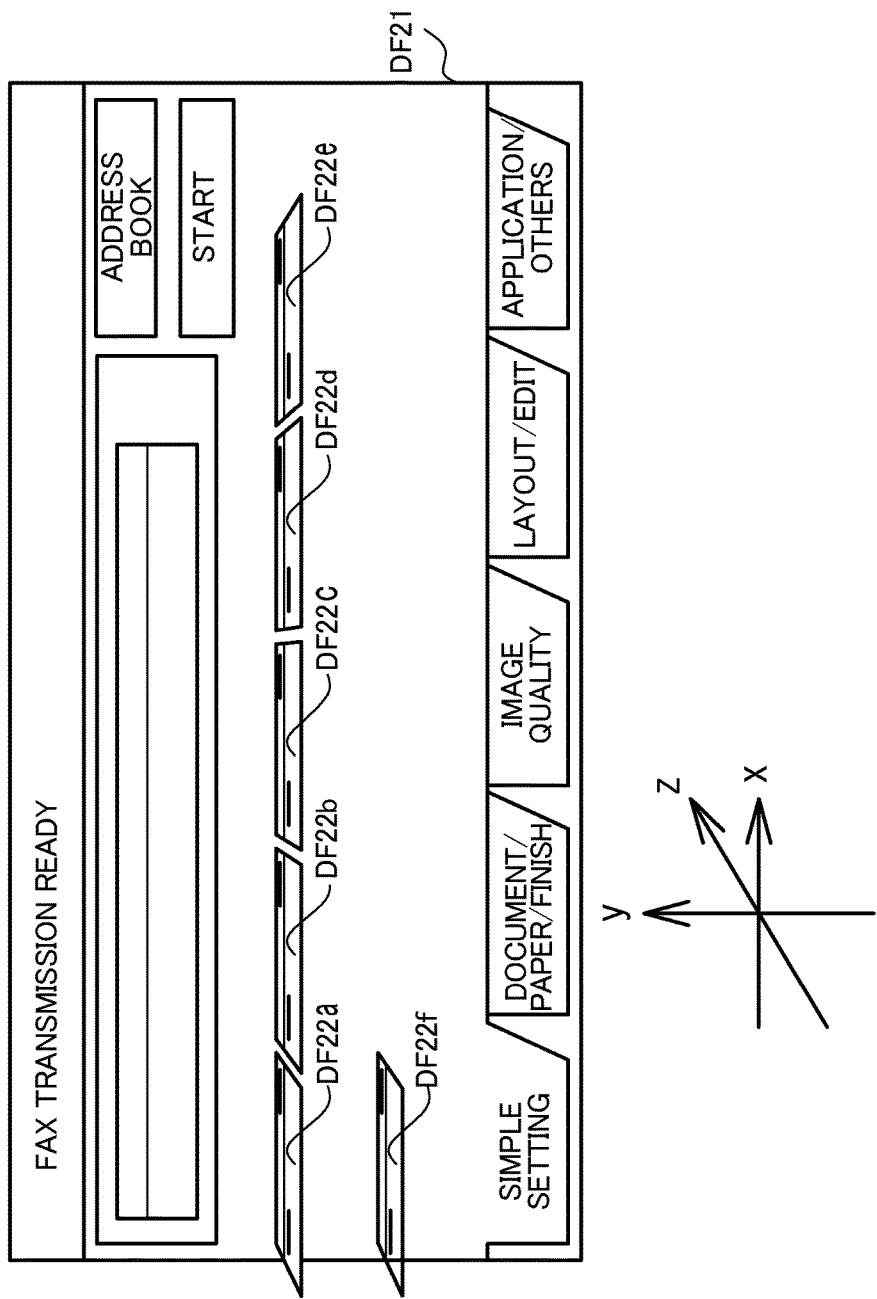

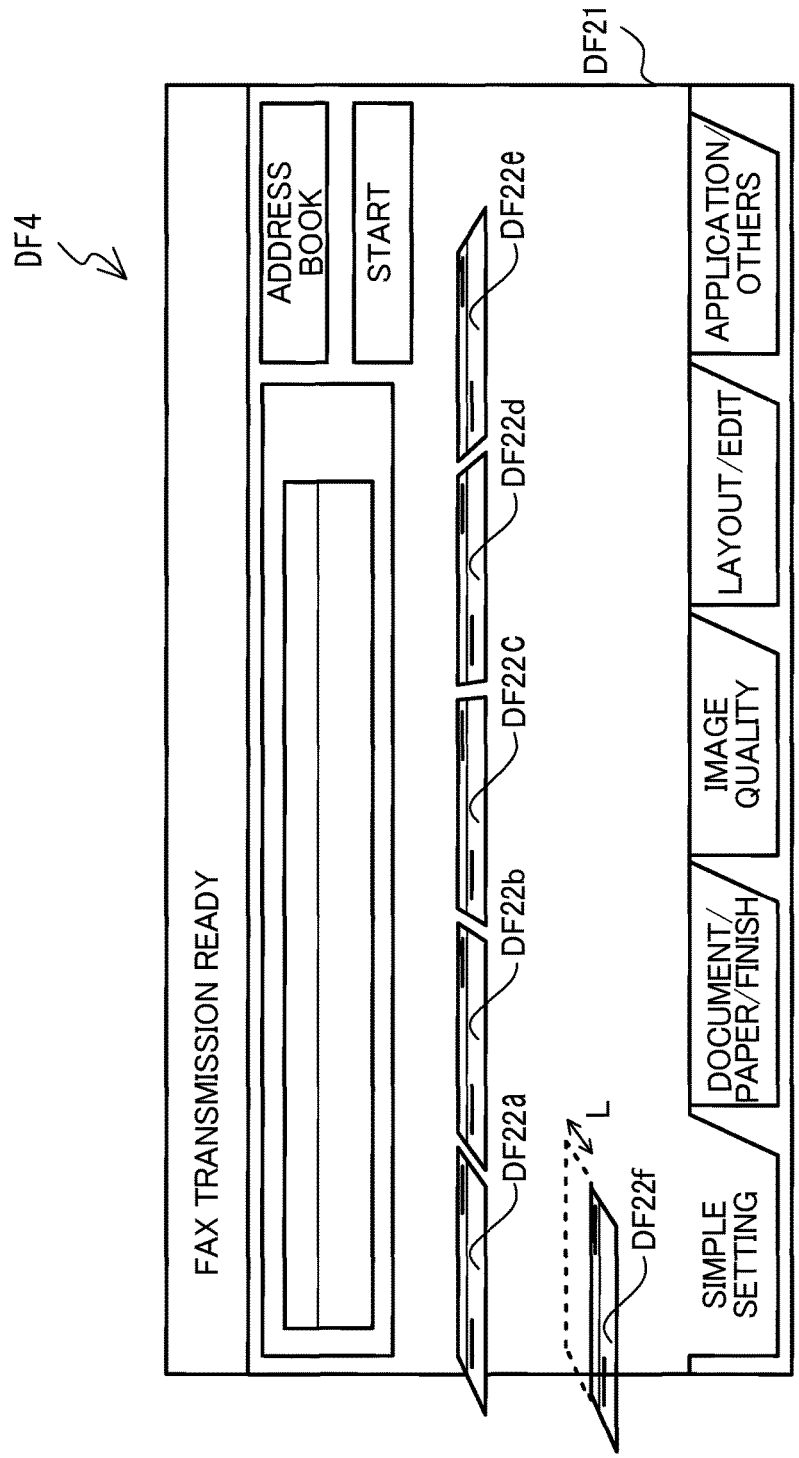

VISIBLE IMAGE FORMING APPARATUS AND IMAGE FORMING APPARATUS

TECHNICAL FIELD

The present invention relates to a visible image forming apparatus and an image forming apparatus, and in particular to a technique to form an operation screen as visible image in the air.

BACKGROUND ART

Nowadays, display devices that form a visible image in the air to display required information have been developed. For example, Patent Literatures (PTL) 1 and 2 cited below disclose a visible image forming apparatus that intermittently emits an invisible laser beam, and generates plasma by collecting the laser beam with lenses and mirrors, to thereby form the visible image representing characters and pictures in the air, on the basis of the visible light from the plasma thus generated.

In addition, PTL 3 cited below proposes an in-vehicle aerial imaging apparatus that forms a visible image in a space inside a vehicle to thereby display required information. The in-vehicle aerial imaging apparatus is configured to display the information required by the passenger of the vehicle at a position inside the vehicle interior that is easy for the passenger to visually recognize, instead of on a display panel attached inside the vehicle interior.

Further, an optical imaging apparatus according to PTL 4 cited below is configured to receive and reflect light from an object or a display device, and converge the reflected light at a position symmetrical to the object or the display device with respect to the optical image forming device, to thereby form an object image in the air.

CITATION LIST

Patent Literature

[PTL 1] Japanese Unexamined Patent Application Publication No. 2003-233339
[PTL 2] Japanese Unexamined Patent Application Publication No. 2007-206588
[PTL 3] Japanese Unexamined Patent Application Publication No. 2010-78623
[PTL 4] Japanese Unexamined Patent Application Publication No. 2013-127625

SUMMARY OF INVENTION

Apart from the above, image forming apparatuses are known that are configured as a multifunction peripheral having a plurality of functions such as copying, printing, scanning, facsimile transmission, and so forth. Accordingly, the technique according to PTL 1 to 4 cited above may be applied to display an operation screen of such an image forming apparatus in the air.

When the operation screen of the image forming apparatus is displayed in the air, not only the operator located close to the image forming apparatus but also persons around the operator can view the operation screen, which provides an advantage in that the information can be shared with the persons around the operator. On the other hand, private information that should not be disclosed to general public, such as log-in information or address information for facsimile transmission, is also revealed to the persons around the operator.

The present invention has been accomplished in view of the foregoing situation, and provides a technique to restrict, when an operation screen is displayed in the air, persons other than the operator from viewing predetermined private information.

In an aspect, the present invention provides a visible image forming apparatus including a visible image forming unit that forms a visible image in the air,
a screen image generation unit that generates a screen image, and
a controller that causes the visible image forming unit to generate the visible image representing the screen image generated by the screen image generation unit.

When the visible image contains predetermined private information, the screen image generation unit generates a second screen image representing the private information and inclined by a predetermined angle with respect to a main screen of the screen image, so as to restrict a person other than an operator from viewing the private information, and the controller causes the visible image forming unit to form a visible image of the generated screen image.

In another aspect, the present invention provides an image forming apparatus including an image forming unit that forms an image on a recording medium, and
the foregoing visible image forming apparatus, in which the controller causes the screen image generation unit to form an operation screen for receiving an instruction to the image forming unit, and causes the visible image forming unit to form a visible image representing the operation screen in the air.

Advantageous Effects of Invention

With the visible image forming apparatus configured as above, when the visible image contains the predetermined private information, the private information is inclined by the predetermined angle with respect to the main screen of the screen image. Such an arrangement prevents the private information from being viewed by persons other than the operator.

BRIEF DESCRIPTION OF DRAWINGS

FIG. 7A is a schematic drawing showing an example of the screen image generated by the screen image generation unit.

FIG. 10A is a schematic drawing showing an example of the screen image generated by the screen image generation unit.

FIG. 10B is a schematic drawing showing an example of the screen image generated by the screen image generation unit.

DESCRIPTION OF EMBODIMENTS

Figure 1:
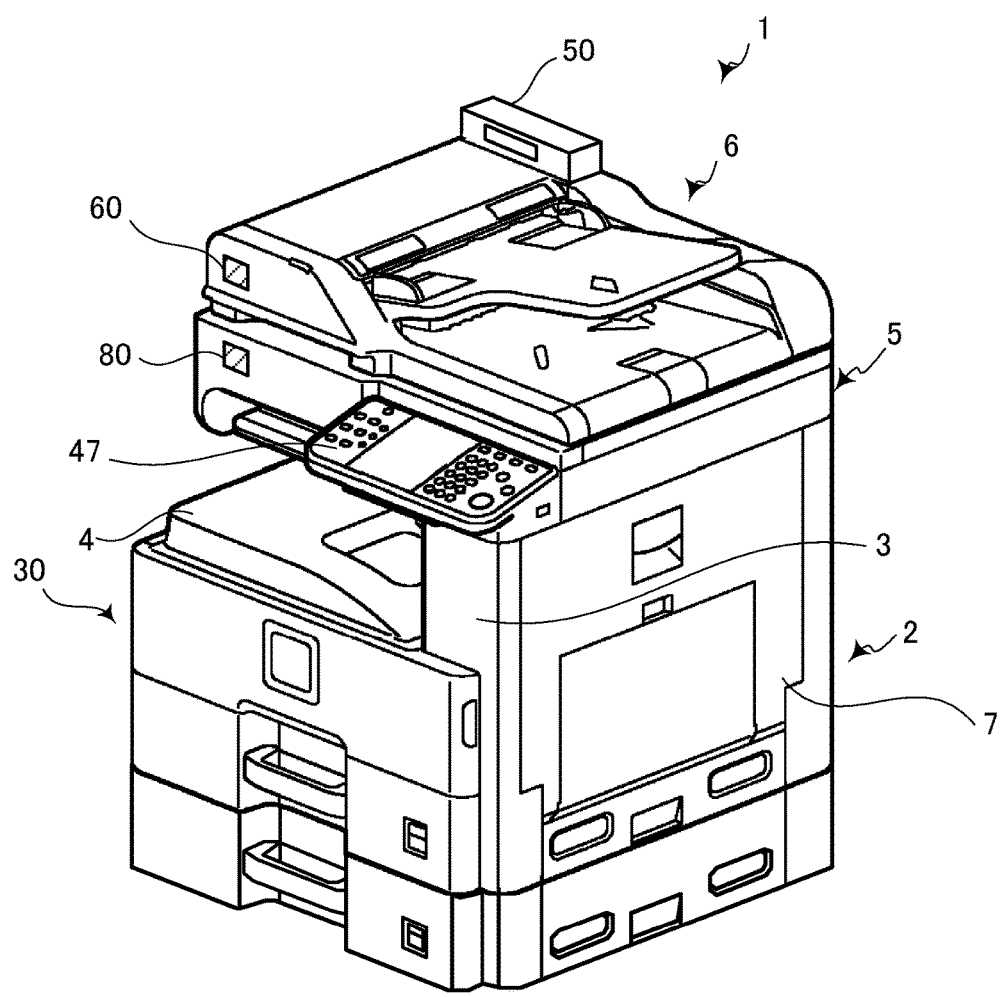
FIG. 1 is a perspective view showing an appearance of an image forming apparatus according to an embodiment of the present invention.

Hereafter, a visible image forming apparatus and an image forming apparatus according to an embodiment of the present invention will be described, with reference to the drawings. FIG. 1 is a perspective view showing an appearance of the image forming apparatus according to the embodiment of the present invention.

The image forming apparatus 1 according to the embodiment of the present invention is a multifunction peripheral having a plurality of functions, such as facsimile transmission, copying, printing, and scanning. As shown in FIG. 1, the image forming apparatus 1 includes a main body 2, an image reading unit 5 located above the main body 2, and a joint portion 3 provided between the image reading unit 5 and the main body 2.

The casing 7 constituting the outer shell of the image forming apparatus 1 accommodates therein a plurality of components that serve to realize various functions of the image forming apparatus 1. For example, the image reading unit 5, an image forming unit 12 (see FIG. 2), a fixing unit, a paper feed unit 30, and a visible image forming unit 50 according to the embodiment of the present invention are provided inside the casing 7.

The image reading unit 5 is an automatic document feeder (ADF) including a document feeder 6, and a scanner that optically reads a source document transported from the document feeder 6 or placed on a non-illustrated contact glass. The image reading unit 5 reads the source documents to be transmitted by facsimile one by one, thereby acquiring image data representing images to be formed.

The image forming unit 12 includes photoconductor drums, charging units, exposure units, developing units, and a transfer unit, and forms (prints) images on the recording sheet delivered from the paper feed unit 30, on the basis of the image read by the image reading unit 5 or print data transmitted from, for example, a personal computer connected to a network. The recording sheet having the image formed thereon undergoes a fixing process performed by the fixing unit, and is discharged to an output tray 4.

The visible image forming unit 50 is configured to form a visible image in the air. (1) The visible image forming unit 50 intermittently emits an invisible laser beam, and generates plasma by collecting the laser beam with lenses and mirrors, to thereby form, in the air, the visible image representing characters and pictures on the basis of the visible light from the plasma thus generated. Such a visible image forming method can be found, for example, in PTL 1 and PTL 2. Alternatively, (2) the visible image forming unit 50 may include an optical image forming device, to receive and reflect light from a display device and converge the reflected light at a position symmetrical to the display device with respect to the optical image forming device, to thereby form an object image in the air. Such a visible image forming method can be found, for example, in PTL 4. In this embodiment, it will be assumed that the visible image forming unit 50 is configured as (1) above.

The operation unit 47 includes, for example, a start key for inputting an instruction to execute a function that the image forming apparatus 1 is configured to perform, a confirmation key (enter key) for fixing a setting inputted through an operation screen represented by the visible image formed by the visible image forming unit 50, and numeric keys for inputting numerals.

In addition, an operation detection unit 60 is provided at an end portion of the front face of the image forming apparatus 1. The operation detection unit 60 detects a pseudo-touch operation simulating an action of the operator of placing the hand in the position where the visible image is formed, when the visible image is formed by the visible image forming unit 50. The operation detection unit 60 outputs, when the pseudo-touch operation is detected, a notice to the effect that the operation has been detected, and position information indicating the position where the operation has been performed, to an instruction reception unit 101 (see FIG. 2).

Further, an operator sensor 80 that detects the operator present within a predetermined range forward of the image forming apparatus 1 is provided at an end portion of the front face of the image forming apparatus 1. The operator sensor 80 is for example an optical sensor including a light emitter and a photodetector, and outputs a detection signal indicating that the operator is present within the predetermined range forward of the image forming apparatus 1, to a controller 100 to be subsequently described, when the photodetector receives the light emitted from the light emitter and reflected by the operator.

Figure 2:
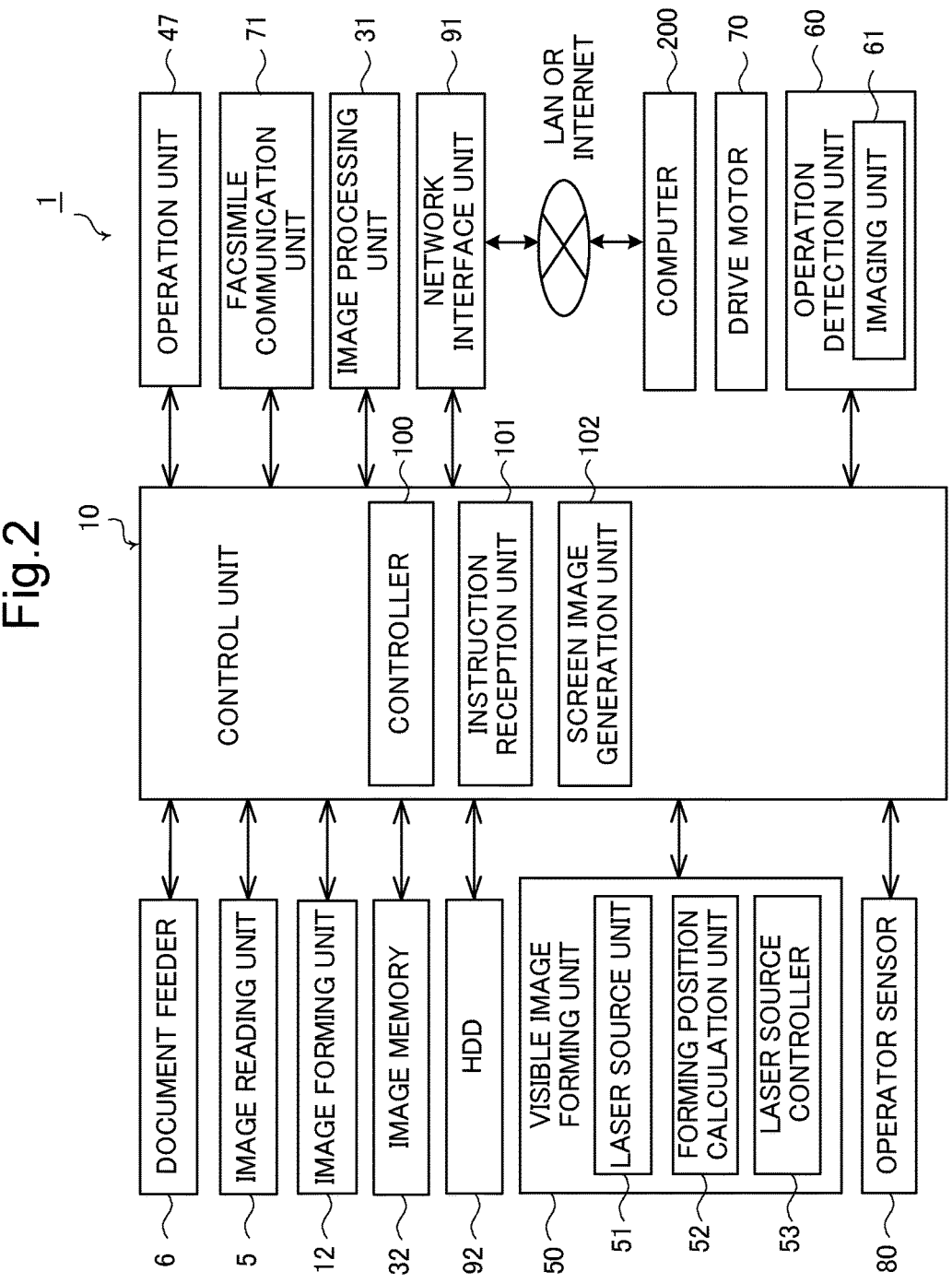
FIG. 2 is a functional block diagram showing an essential internal configuration of the image forming apparatus.

Hereunder, a configuration of the image forming apparatus 1 will be described. FIG. 2 is a functional block diagram showing an essential internal configuration of the image forming apparatus 1.

The image forming apparatus 1 includes a control unit 10. The control unit 10 includes a central processing unit (CPU), a RAM, a ROM, and an exclusive hardware circuit.

The image reading unit 5 includes a reading mechanism having a light emitter, a CCD sensor, and so forth, and is configured to operate under the control of the control unit 10. The image reading unit 5 emits light from the light emitter onto the source document and receives the reflected light with the CCD sensor, thus to read an image from the source document.

The image processing unit 31 processes the data of the image read by the image reading unit 5, as required. For example, the image processing unit 31 performs a predetermined image processing such as shading correction, to improve the image quality after the image is read by the image reading unit 5 and formed by the image forming unit 12.

The image memory 32 is a region for temporarily storing the image data of the source document read by the image reading unit 5, and data to be formed into an image by the image forming unit 12.

The image forming unit 12 forms an image, for example based on the print data read by the image reading unit 5, and the print data received from a computer 200 connected to the network.

The operation unit 47 is used to input instructions of the operator to execute operations and processing that the image forming apparatus 1 is configured to perform.

The HDD 92 is a large-capacity storage device for storing, for example, the image data of the source document read by the image reading unit 5. The image forming apparatus 1 is configured to perform a plurality of predetermined functions such as copying, scanning, facsimile communication, and printing, for each of which an operation screen (screen image), for inputting set values of items that have to be specified to execute the corresponding function, is prepared. In addition, template screens of the respective operation screens (screen images) and information to be attached to the screen image are stored in a part of the storage region of the HDD 92. The accompanying information includes, for example, address information necessary for the facsimile function.

The visible image forming unit 50 is configured to form a visible image in the air, under the control of the controller 100. In this embodiment, the visible image forming unit 50 intermittently emits an invisible laser beam, and generates plasma by collecting the laser beam with lenses and mirrors, to thereby form, in the air, the visible image representing characters and pictures. The visible image forming unit 50 at least includes a laser source unit 51, a forming position calculation unit 52, and a laser source controller 53.

The laser source unit 51 emits an invisible laser beam under the control of the laser source controller 53. The laser source unit 51 includes a laser source that emits a laser beam, lenses and mirrors that collect the laser beam from the laser source to thereby generate plasma, and a scanning mechanism that allows the laser source, as well as the lenses and mirrors to perform a scanning action.

The forming position calculation unit 52 calculates the emission direction and emission position of the laser beam from the laser source unit 51, so as to allow the visible image representing the screen image received from the controller 100 to be formed at a predetermined visible image forming position (position on a predetermined three-dimensional coordinate system). In other words, the forming position calculation unit 52 calculates the visible image forming position where the laser source unit 51 is to generate the plasma.

The laser source controller 53 controls the laser source unit 51, so as to cause the air present in the emission direction and emission position of the laser beam, calculated by the forming position calculation unit 52, to perform plasma emission. The visible image is generated by luminescent spots that appear at the intersections of two laser beams, and therefore the laser source controller 53 controls the laser source unit 51 so as to adjust the timing to emit the two laser beams such that, for example, the positions of the luminescent spots correspond to the pixels constituting the image.

When a three-dimensional visible image is to be formed, the forming position calculation unit 52 repeatedly calculates and updates the emission direction and the emission position of the laser beam to be realized by the laser source unit 51 in XYZ-directions in the air. The laser source controller 53 controls the laser source unit 51 so that the gas present in the emission direction and at the emission position of the laser beam makes plasma emission, each time the emission direction and the emission position of the laser beam are updated. The laser source controller 53 controls the scanning mechanism of the laser source unit 51 so as to move the lens in the laser emission direction (e.g., Z-direction corresponding to depth direction when XY-directions are defined as two-dimensional directions), to thereby change the plasma emission position in the laser emission direction (Z-direction). The visible image forming unit 50 is made to switch the position of the plasma emission in the laser emission direction (Z-direction) at such a high speed that a human is unable to visually recognize, and therefore to human eyes it looks as if a three-dimensional visible image were formed, owing to afterimages the remain in the human eyes.

The control unit 10 includes the controller 100, an instruction reception unit 101, and a screen image generation unit 102.

The control unit 10 acts as the controller 100, the instruction reception unit 101, and the screen image generation unit 102, by acting according to a control program installed in the HDD 92. However, the controller 100, the instruction reception unit 101, and the screen image generation unit 102 may each be realized by a hardware circuit, instead of causing the control unit 10 to act according to the control program.

The controller 100 is connected to the image reading unit 5, the document feeder 6, the image processing unit 31, the image memory 32, the image forming unit 12, the operation unit 47, the facsimile communication unit 71, the network interface unit 91, the HDD 92, the visible image forming unit 50, the operation detection unit 60, and the operator sensor 80, to control the operation of the mentioned components.

The instruction reception unit 101 receives the job instruction corresponding to the pseudo-touch operation detected by the operation detection unit 60. In the instruction reception unit 101, the job instructions, associated with the combination of the type of the operation screen and the position information of the pseudo-touch operation, are stored in advance. Upon receipt of a notice that the pseudo-touch operation on a certain operation screen has been detected and the position information of the pseudo-touch operation from the operation detection unit 60, the instruction reception unit 101 identifies the job instruction associated with the type of the operation screen and the position information of the pseudo-touch operation, and receives the job instruction thus identified, as the instruction from the operator.

The screen image generation unit 102 generates the screen image according to the job instruction received by the instruction reception unit 101. The screen image generation unit 102 generates the screen image using, for example, the template screen of each of the operation screens (screen images) stored in the HDD 92. For example, when the screen image for inputting a destination necessary for executing the facsimile function is to be generated, the screen image that enables the operator to input the destination is generated, using the template screen for inputting the destination and the address information, which is the accompanying information, stored in the HDD 92.

The operation detection unit 60 is configured to detect, when the visible image is formed by the visible image forming unit 50 in the predetermined spatial position, a pseudo-touch operation simulating an action of the operator of placing his/her hand in the display position of the operation screen formed as visible image. The operation detection unit 60 outputs, to the instruction reception unit 101, a notice to the effect that the pseudo-touch operation has been detected, information indicating on which operation screen the pseudo-touch operation has been performed, and the position information of the pseudo-touch operation.

For example, the operation detection unit 60 includes an imaging unit 61. The imaging unit 61 shoots a predetermined range in a three-dimensional space from the predetermined forming position where the visible image is formed by the visible image forming unit 50. The operation detection unit 60 identifies an image such as the operator's hand and the spatial position of that image, on the basis of the image that has been shot by the imaging unit 61, and detects, when the spatial position of the image is within a predetermined area (for example, within 10 mm in at least one of x, y, and z directions) from the operation screen formed as visible image in the predetermined forming position, that the pseudo-touch operation is being performed with respect to the operation screen formed as visible image, and acquires the position information indicating the position where the pseudo-touch operation has been performed.

For example, the operation detection unit 60 processes the image that has been shot by the imaging unit 61, by image thresholding and pattern matching based on shading information, to thereby identify the image of the operator. In this embodiment, the operation detection unit 60 decides whether the shot image contains the image of the operator's hand, by pattern matching between the image of the operator's hand extracted from the shot image and a reference image stored in advance in the operation detection unit 60. Upon identifying the image of the hand, the operation detection unit 60 detects the position of the image as coordinate position on a predetermined three-dimensional coordinate. Then the operation detection unit 60 decides whether any part of the image of the hand overlaps with any part of the predetermined spatial position where the operation screen is formed as visible image. In the case where the image of the hand overlaps with the predetermined spatial position of the operation screen, the operation detection unit 60 detects that the pseudo-touch operation is being performed with respect to the operation screen. The operation detection unit 60 outputs a notice to the effect that the pseudo-touch operation is being performed, and position information indicating the position where the pseudo-touch operation is being performed, to the instruction reception unit 101.

The facsimile communication unit 71 includes an encoding/decoding unit, a modem and a network control unit (NCU), which are not shown, and is configured to transmit a facsimile through the public telephone network.

The network interface unit 91 includes a communication module such as a LAN board, and is configured to transmit and receive data to and from a computer 200 or other devices in the local area, through the LAN connected to the network interface unit 91. A plurality of computers 200 may be connected to the image forming apparatus 1.

The drive motor 70 serves as a drive source that provides rotational force to rotating components and transport roller pairs in the image forming unit 12.

The operator sensor 80 serves, as already mentioned, to detect the operator present within a predetermined range forward of the image forming apparatus 1.

Here, the visible image forming unit 50, the controller 100, and the screen image generation unit 102 may be construed as an embodiment of the visible image forming apparatus according to the present invention.

Figure 3:
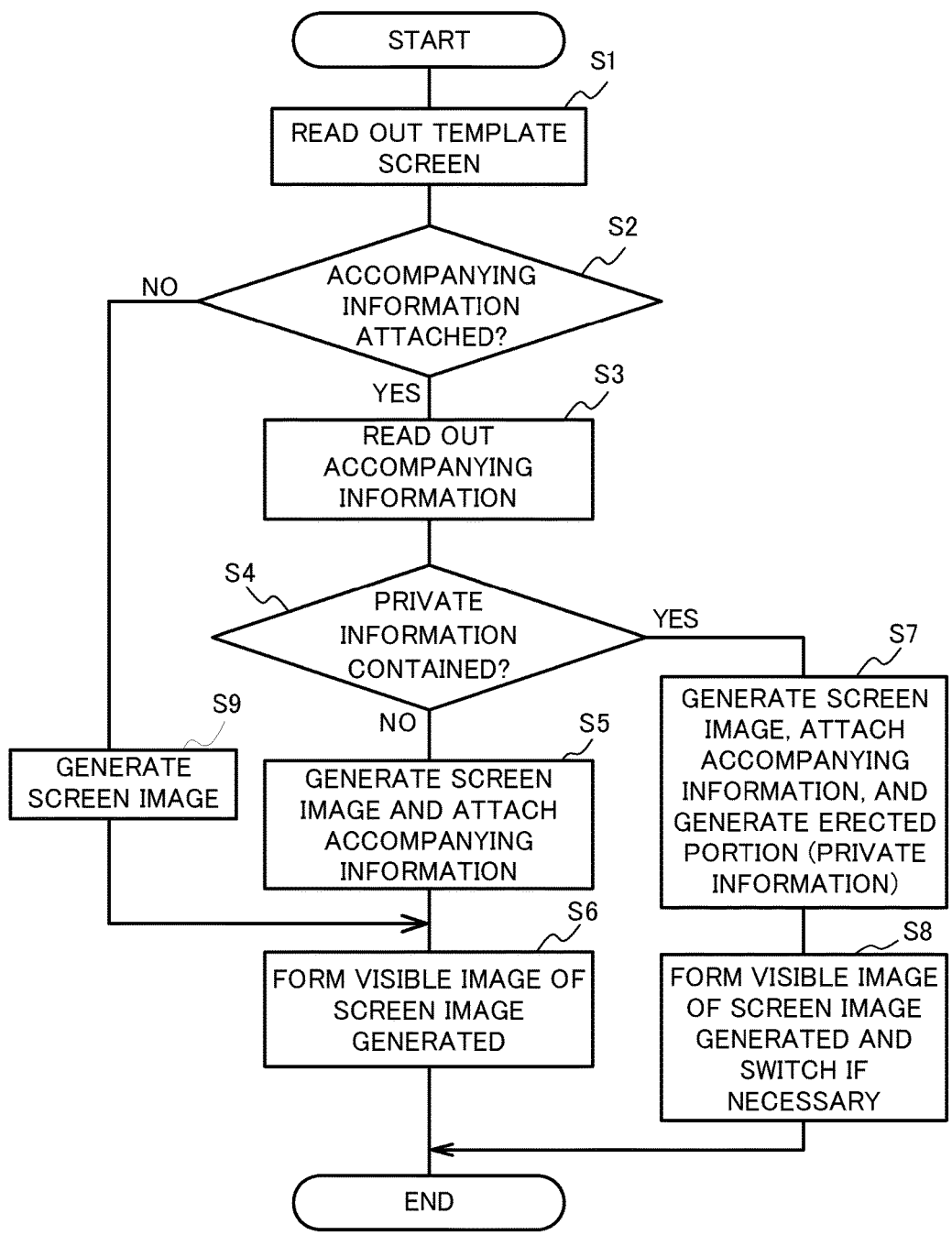
FIG. 3 is a flowchart showing a process performed by a visible image forming unit to form a visible image of an operation screen.

Hereunder, a process performed by the visible image forming unit 50 to form the visible image of the operation screen will be described. FIG. 3 is a flowchart showing a process performed by the visible image forming unit 50 to form the visible image of the operation screen. The process described below is performed when the instruction reception unit 101 receives an instruction to display the operation screen (including transition instruction).

The controller 100 reads out the template screen from the HDD 92, on the basis of the job instruction received by the instruction reception unit 101 (S1), and decides whether accompanying information exists with respect to the template screen that has been read out (S2). When it is decided that the accompanying information exists (YES at S2), the controller 100 reads out the accompanying information that is necessary, from the HDD 92 (S3).

In the case of copying for example, print information such as magnification and density preset by a system manager or the like is stored in the HDD 92 as the accompanying information. In the case of facsimile transmission, address information such as addressee's name and phone number is stored in the HDD 92 as the accompanying information.

When the instructed job received by the reception unit 101 is copying, the controller 100 reads out the print information such as magnification and density from the HDD 92, as the accompanying information. When the instructed job received by the reception unit 101 is facsimile transmission, the controller 100 reads out the address information such as the addressee's name and phone number from the HDD 92, as the accompanying information.

Then the controller 100 decides whether the accompanying information read out as above contains predetermined private information (S4). When the controller 100 decides that the accompanying information does not contain the predetermined private information (NO at S4), the screen image generation unit 102 generates the operation screen (screen image) by attaching the accompanying information to the template screen, using the template screen and the accompanying information that have been read out (S5). Here, the predetermined private information refers to, for example, personal information such as addressee's name and phone number. However, the private information is not limited to the above.

Figure 4:
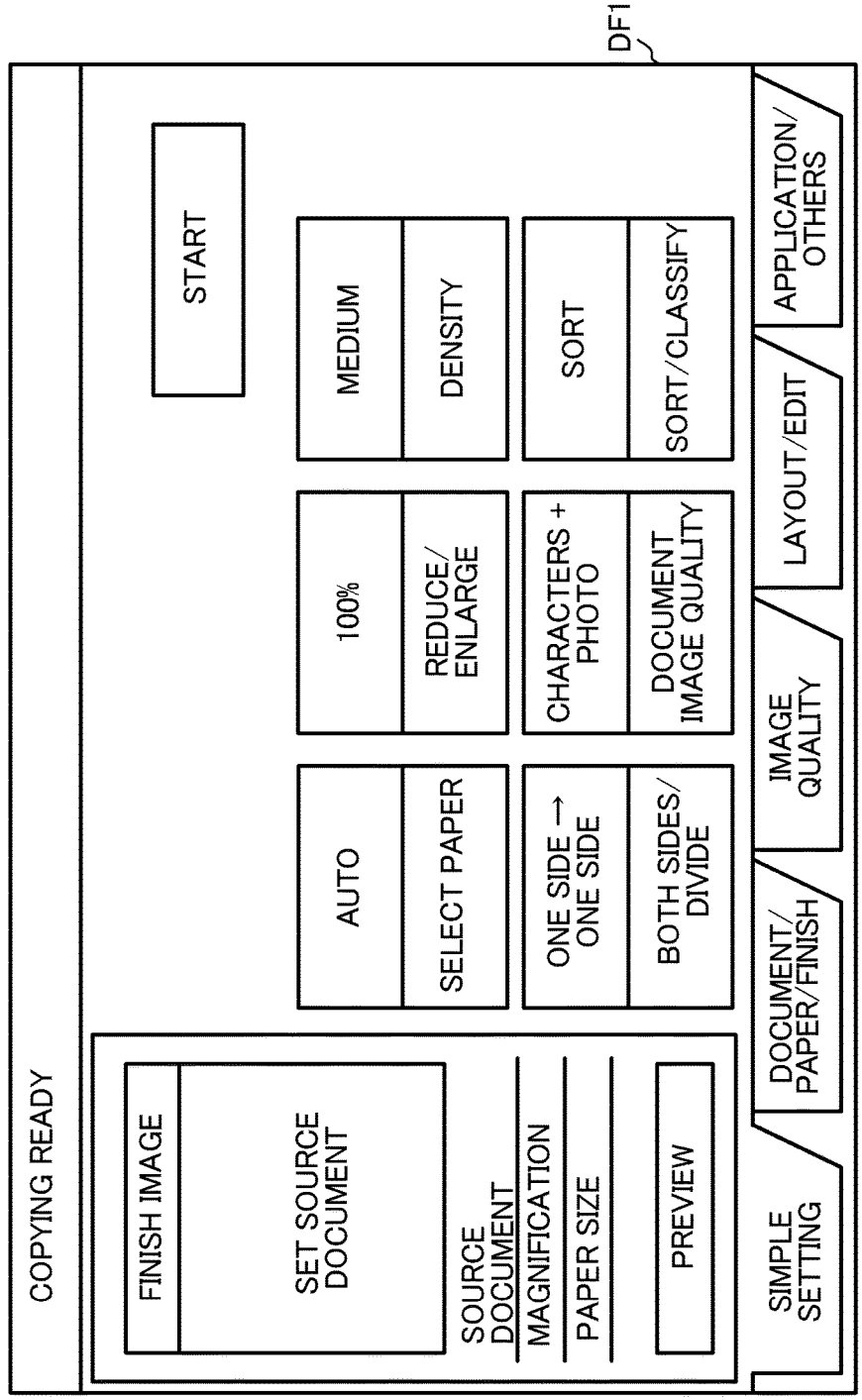
FIG. 4 is a schematic drawing showing an example of a screen image generated by a screen image generation unit.

For example, when the instructed job received by the instruction reception unit 101 is copying and the accompanying information includes the print information such as magnification (e.g., 100%) and density (e.g., medium) preset by the system manager, the screen image generation unit 102 generates a screen image DF1 shown in FIG. 4, because the accompanying information is not the predetermined private information.

Figure 5:
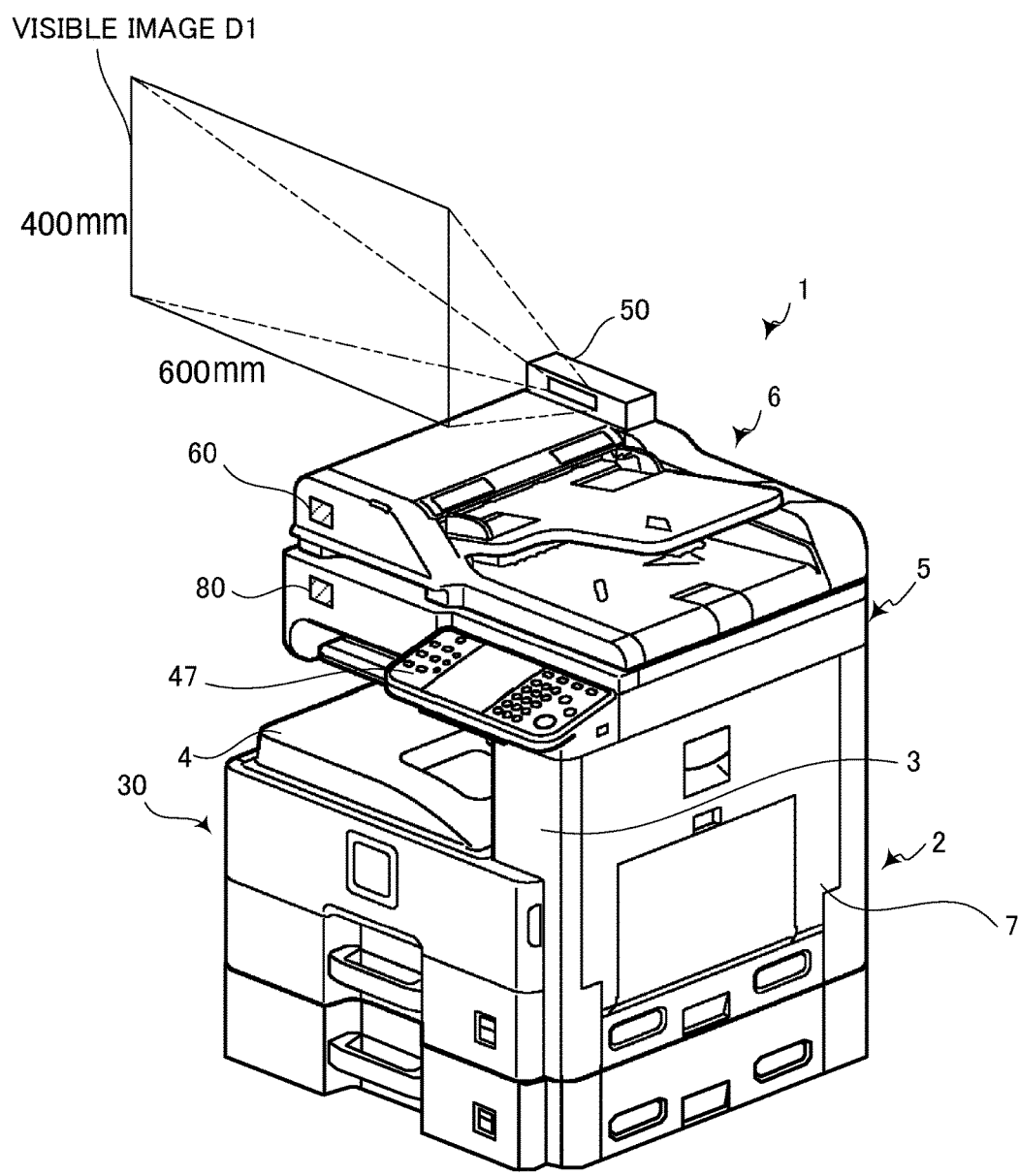
FIG. 5 is a perspective view showing how the visible image representing the operation screen is formed in the air.
Figure 6:
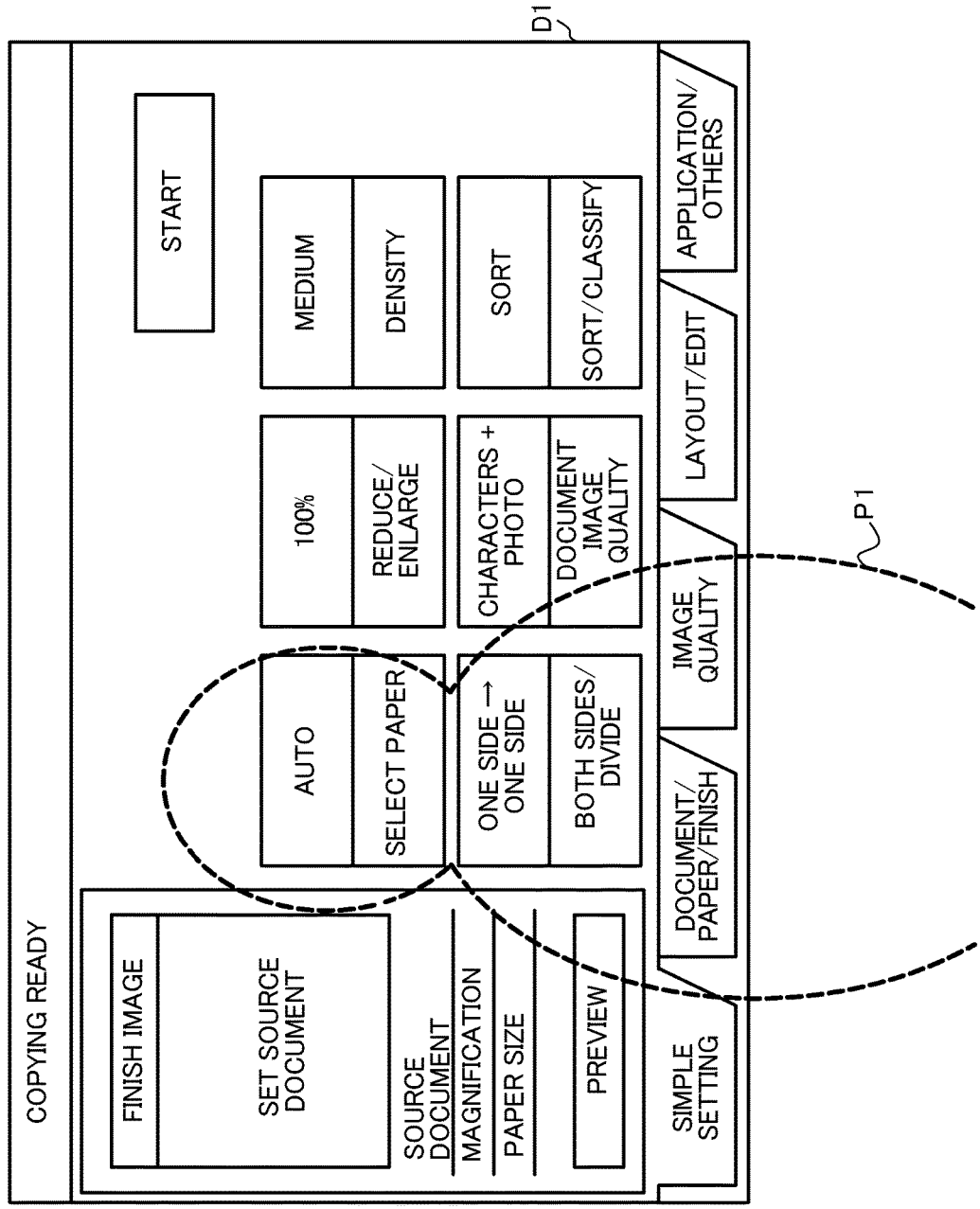
FIG. 6 is a schematic drawing showing the visible image representing the operation screen formed in the air.

The controller 100 causes the visible image forming unit 50 to form a visible image D1 shown in FIG. 5 and FIG. 6, in a predetermined spatial position using the screen image DF1 (S6). In this embodiment, the predetermined spatial position where the visible image D1 is to be formed is located, as shown in FIG. 5 and FIG. 6, forward of the image forming apparatus 1 and in the vicinity of a plane flush with an end portion of the front face of the image forming apparatus 1, and at a height corresponding to the eyes of an operator P1 of an average height. The controller 100 causes the visible image forming unit 50 to form the visible image D1, for example such that the screen formed as the visible image D1 in the predetermined spatial position becomes generally perpendicular to the floor on which the image forming apparatus 1 is installed.

When the visible image D1 is thus formed, the visible image D1 is located in a space in front of the eyes of the operator P1 standing forward of the image forming apparatus 1 as shown in FIG. 6, and therefore the visible image D1 is easier for the operator P1 to visually recognize, than the case of viewing, for example, an LCD screen provided on the image forming apparatus 1. The visible image D1 may be formed, for example, in a size of 400 mm in height by 600 mm in width.

In contrast, when the controller 100 decides at S4 that the accompanying information contains the predetermined private information, for example the address information (YES at S4), the screen image generation unit 102 screen image generation unit 102 generates, using the template screen and the accompanying information that have been read out, an operation screen (screen image) including an erected portion inclined by a predetermined angle (e.g., 80 degrees) with respect to the main screen of the screen image, the erected portion displaying the private information, to thereby restrict persons other than the operator from viewing the private information (S7).

Figure 7B:
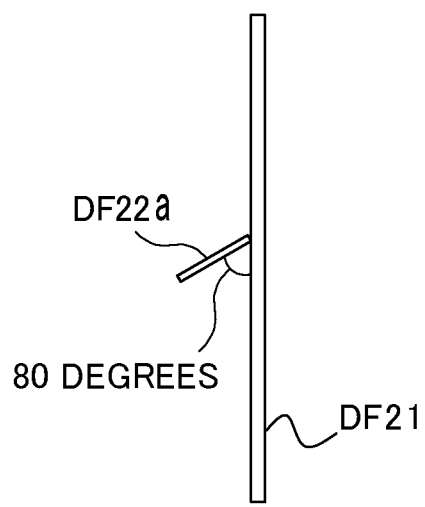
FIG. 7B is a schematic drawing showing the screen image viewed from a direction of an arrow A in FIG. 7A.
Figure 7C:
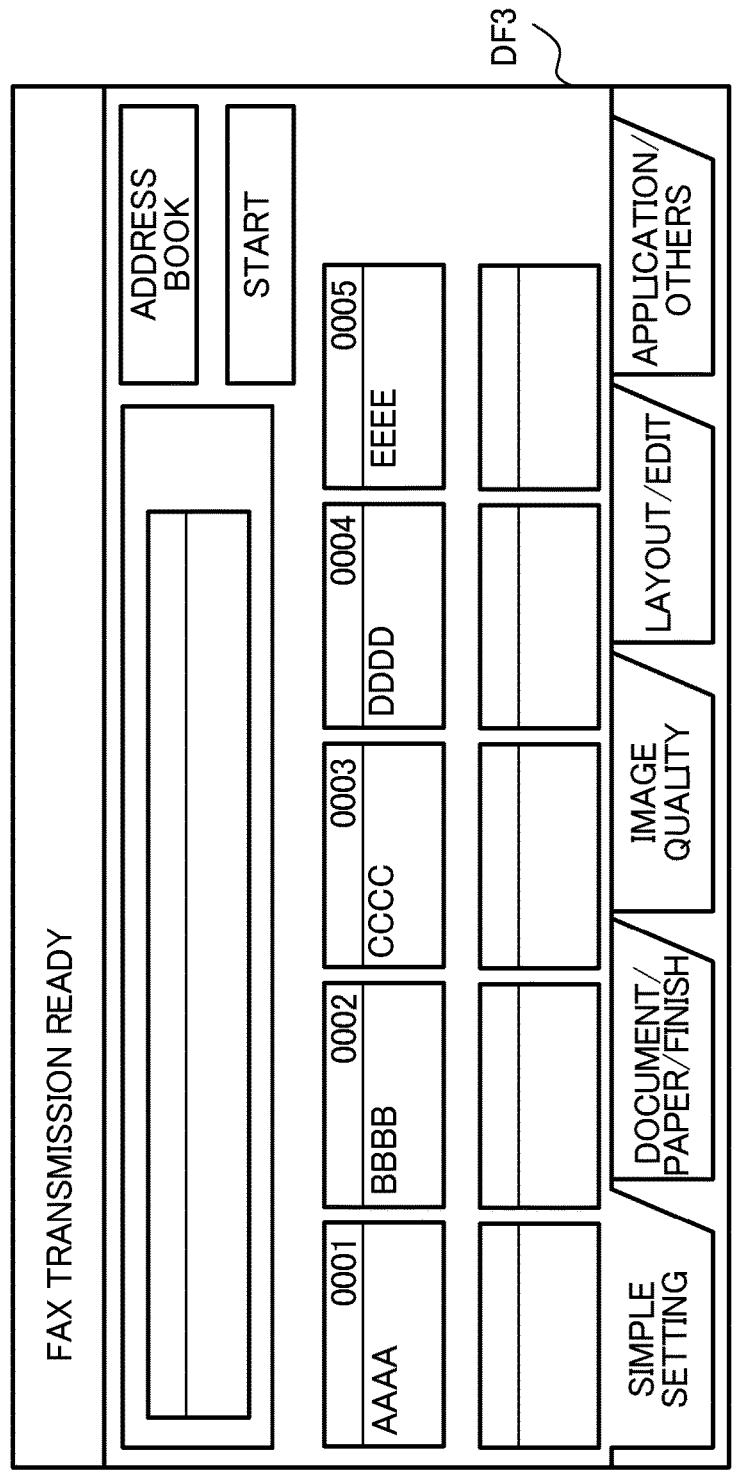
FIG. 7C is a schematic drawing showing an example of the screen image generated by the screen image generation unit.

When the instructed job received by the instruction reception unit 101 is facsimile transmission, and the accompanying information includes address information (e.g., addressee's name), the screen image generation unit 102 generates a screen image DF2 including erected portions DF22a to DF22e inclined by a predetermined angle (e.g., 80 degrees) with respect to a main screen DF21, as shown in FIG. 7A and FIG. 7B, the erected portions DF22a to DF22e each displaying the private information. Here, FIG. 7C shows an example of a screen image DF3 without the erected portion formed thereon. Thus, the screen image generation unit 102 generates the screen image including the erected portions DF22a to DF22e displaying the private information, such that the visible image of the erected portions DF22a to DF22e is formed in the three-dimensional region in the air extending in the XYZ-directions, with the inclination by the predetermined angle with respect to the main screen. In this case, the screen image generation unit 102 generates the screen image such that the private information is displayed on the upper face of the erected portions DF22a to DF22e.

Figure 8:
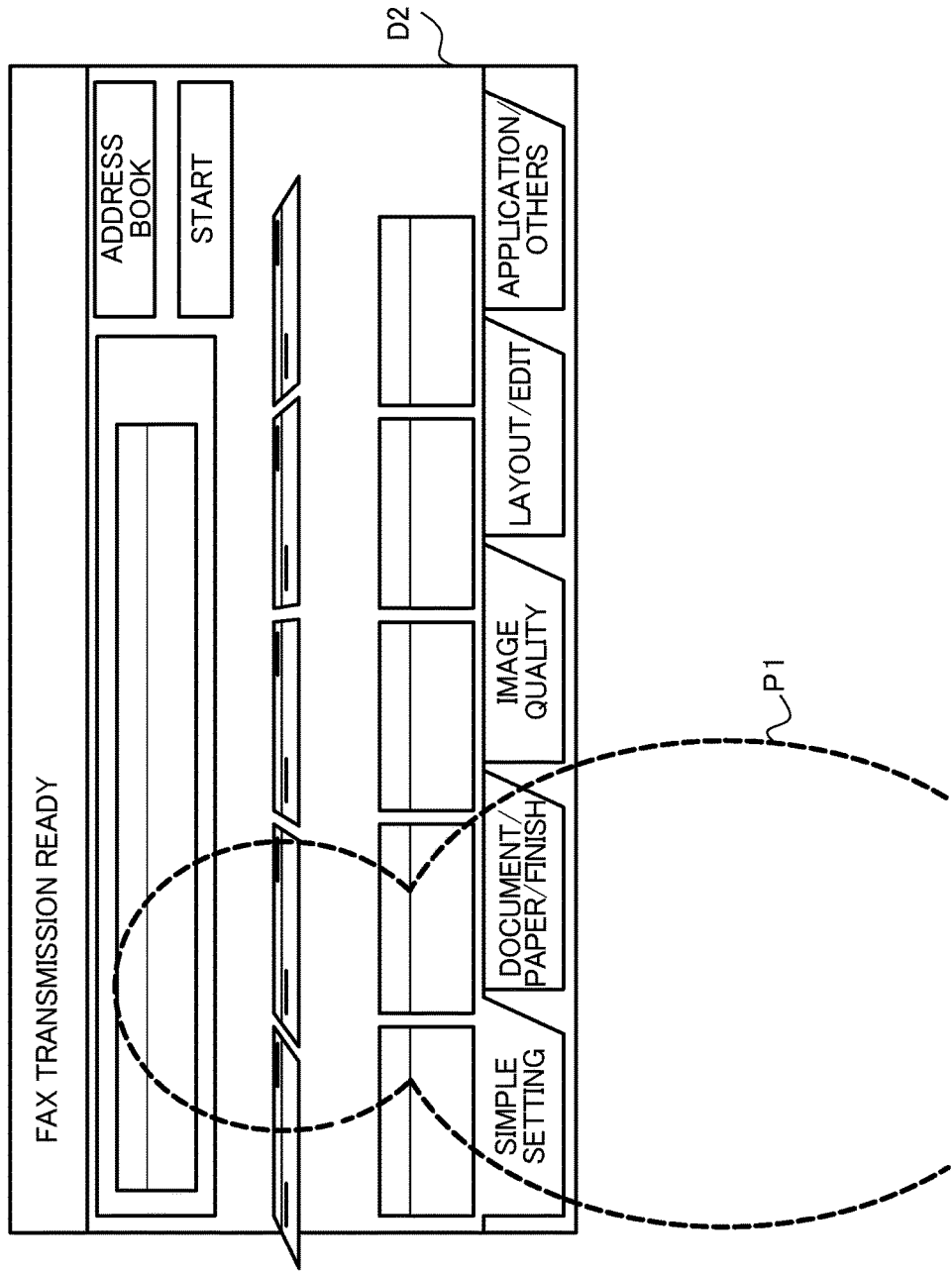
FIG. 8 is a schematic drawing showing the visible image representing the operation screen formed in the air.
Figure 9A:
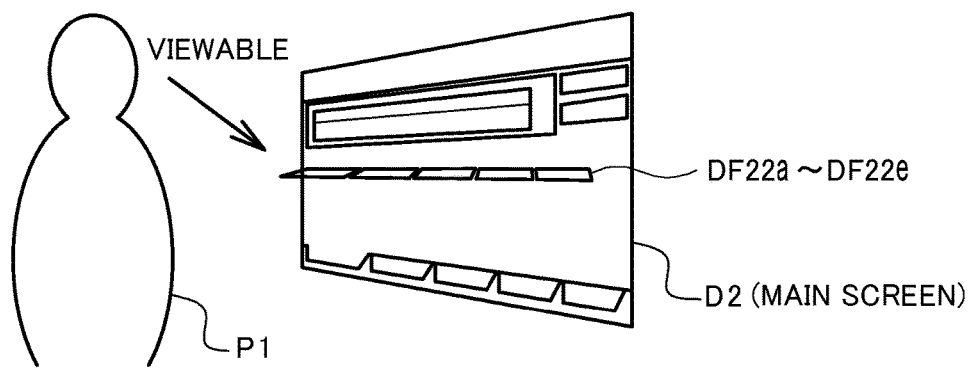
FIG. 9A is a schematic perspective view showing how the visible image representing the operation screen is formed in the air.
Figure 9B:
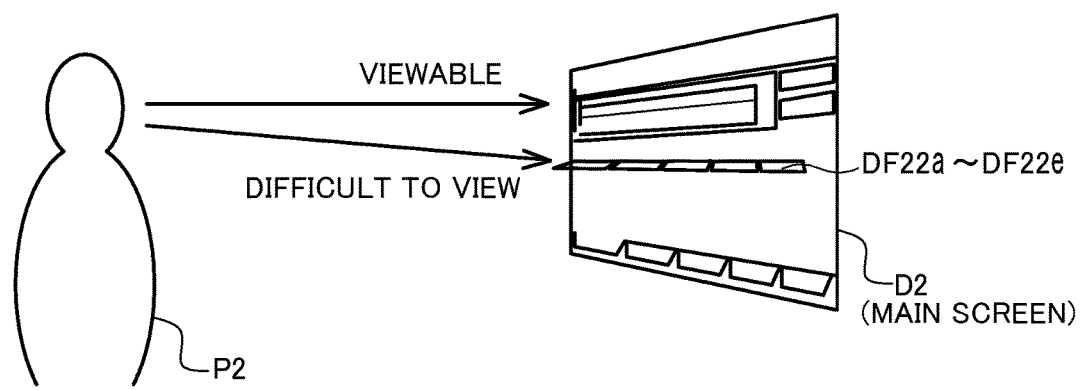
FIG. 9B is a schematic perspective view showing how the visible image representing the operation screen is formed in the air.

The controller 100 causes the visible image forming unit 50 to form a visible image D2 in the air as shown in FIG. 8, FIG. 9A, and FIG. 9B, using the screen image DF2 formed as above (S8). In this case, the controller 100 causes the visible image forming unit 50 to form the visible image D as shown in FIG. 9A, in a spatial position where the erected portions DF22a to DF22e are located at a lower position than the eyes of the operator P1 having an average height and located closely forward of the visible image D2. Although the operator P1, located close to the erected portions DF22a to DF22e inclined with respect to the main screen, can easily view the private information displayed on the upper face of the erected portions DF22a to DF22e as shown in FIG. 9A, it is difficult for a viewer P2, located at a position distant from the main screen, to view the private information displayed on the upper face of the erected portions DF22a to DF22e, as shown in FIG. 9B. To realize the three-dimensional visible image of the erected portions DF22a to DF22e, the visible image forming unit 50 controls the scanning mechanism according to the procedure for forming the three-dimensional visible image.

When a plurality of erected portions inclined with respect to the screen image are formed, for example the erected portion DF22a and the erected portion DF22f may overlap in the vertical direction as shown in FIG. 10A, such that the visible image representing the erected portion DF22f on the lower side becomes unviewable from the operator. When a plurality of erected portions thus overlap in the vertical direction (Y-direction), the screen image generation unit 102 decides whether there are any erected portions overlapping in the X-direction, on the basis of the X-coordinate information of each of the erected portions. When it is decided that there are erected portions overlapping in the X-direction, the screen image generation unit 102 moves one of the erected portions overlapping in the Y-direction, in the Z-direction as shown in FIG. 10B, when generating the screen image.

In this case, the screen image generation unit 102 calculates, on the basis of the Z-coordinate information of the erected portions overlapping in the X-direction, an overlapping length L of such erected portions in the Z-direction, and then calculates the positional relationship in the vertical direction between these erected portions on the basis of the Y-coordinate information thereof, to thereby generate a screen image DF4, including the erected portions DF22a and DF22f aligned in a stair-like form such that the erected portion on the lower side is away from the main screen in the Z-direction by a distance equal to or longer than the length L, as shown in FIG. 10B.

When the controller 100 decides at S2 shown in FIG. 3 that the accompanying information related to the template screen that has been read out does not exist (NO at S2), the screen image generation unit 102 generates an operation screen (screen image) without the three-dimensional erected portion, using the template screen that has been read out (S9). The controller 100 causes the visible image forming unit 50 to form the visible image in the air, using the screen image generated by the screen image generation unit 102 (S6).

According to this embodiment, when the visible image includes the predetermined private information, the erected portions DF22a to DF22e inclined by the predetermined angle with respect to the main screen DF21 are generated, and the visible image of the operation screen DF2, in which the private information is displayed on the upper face of the erected portions DF22a to DF22e, is formed. Therefore, the operator P located closely forward of the operation screen DF2 can easily view the erected portions DF22a to DF22e, while it is difficult for persons more distant from the operation screen DF2 than is the operator P to view the operation screen DF2 on which the private information is displayed.

The inclination angle of the erected portion with respect to the main screen may be varied depending on the degree of confidentiality of the private information, instead of fixing the angle to a certain value. For example, the screen image generation unit 102 may regard the personal information used for logging in as most confidential, and set the inclination angle to 90 degrees for such information, while setting the inclination angle to 80 degrees for the information such as the addressee's name, when generating the screen image. When the inclination angle is set to 90 degrees for the most confidential information, the operator P has to be still closer to the operation screen DF2 in order to view the upper face of the erected portions DF22a to DF22e. Therefore, for persons other than the operator P, naturally, it becomes more difficult to view the private information displayed on the upper face of the erected portions DF22a to DF22e.

The present invention is not limited to the foregoing embodiment, but may be modified in various manners. For example, although the visible image forming apparatus is exemplified by the image forming apparatus 1 in the foregoing embodiment, the present invention is broadly applicable to various electronic apparatuses other than the image forming apparatus 1.

Further, the configurations and processing according to the foregoing embodiment, described above with reference to FIG. 1 to FIG. 10B, are merely exemplary and in no way intended to limit the configurations and processing of the present invention.

The invention claimed is:

1. A visible image forming apparatus comprising:
a visible image forming unit that forms a visible image in the air;
a screen image generation unit that generates a screen image; and
a controller that causes the visible image forming unit to generate the visible image representing the screen image generated by the screen image generation unit,
wherein, when the visible image contains predetermined private information, the screen image generation unit generates a second screen image representing the private information and inclined by a predetermined angle with respect to a main screen of the screen image, so as to restrict a person other than an operator from viewing the private information, and the controller causes the visible image forming unit to form a visible image of the screen image generated by the screen image generation unit.

2. The visible image forming apparatus according to claim 1,
wherein the screen image generation unit generates the screen image in which only the second screen image representing the private information is erected from the main screen other than the second screen image representing the private information, with the inclination by the predetermined angle, and
the controller causes the visible image forming unit to form the visible image representing the screen image, such that the main screen becomes generally perpendicular to a ground on which the visible image forming apparatus is installed.

3. The visible image forming apparatus according to claim 2,
wherein the screen image generation unit forms the screen image, when forming a plurality of the second screen images each representing the private information with the inclination by the predetermined angle with respect to the main screen, such that each of the second screen images representing the private information is located at a position that restricts the second screen images erected from the main screen from overlapping in a vertical direction.

4. The visible image forming apparatus according to claim 1,
wherein an angle by which the second screen image is inclined with respect to the main screen portion is determined depending on a degree of confidentiality of the private information.

5. The visible image forming apparatus according to claim 1,
wherein the screen image generation unit generates the screen image in which a plurality of the second screen images representing the private information are shifted from each other with respect to the main screen, in a direction in which the operator views the visible image, and the controller causes the visible image forming unit to form, in the air, the visible image representing the screen image generated by the screen image generation unit.

6. An image forming apparatus comprising:
an image forming unit that forms an image on a recording medium; and
the visible image forming apparatus according to claim 1,
wherein the controller causes the screen image generation unit to form an operation screen for receiving an instruction to the image forming unit, and causes the visible image forming unit to form a visible image representing the operation screen in the air.

* * * * *